US 6,702,666 B2

(12) United States Patent
Ho et al.

(10) Patent No.: US 6,702,666 B2
(45) Date of Patent: *Mar. 9, 2004

(54) COMBINE HAVING A SYSTEM ESTIMATOR TO MONITOR HYDRAULIC SYSTEM PRESSURE

(75) Inventors: Yun-Ren Ho, Naperville, IL (US); John E. Bundy, Racine, WI (US); John G. Brome, Delavan, WI (US)

(73) Assignee: Case, LLC, Racine, WI (US)

( * ) Notice: Subject to any disclaimer, the term of this patent is extended or adjusted under 35 U.S.C. 154(b) by 7 days.

This patent is subject to a terminal disclaimer.

(21) Appl. No.: 10/166,916

(22) Filed: Jun. 11, 2002

(65) Prior Publication Data
US 2003/0228893 A1 Dec. 11, 2003

(51) Int. Cl.[7] .................................................. A01D 75/00
(52) U.S. Cl. ........................................ 460/6; 56/10.2 H
(58) Field of Search ................... 460/6, 3, 1; 56/10.2 H, 56/10.2 R, 10.3, DIG. 15

(56) References Cited

U.S. PATENT DOCUMENTS

| | | | | |
|---|---|---|---|---|
| 3,093,946 A | * | 6/1963 | Pitt et al. ....................... | 460/6 |
| 4,337,611 A | * | 7/1982 | Mailander et al. ............. | 460/7 |
| 5,873,227 A | * | 2/1999 | Arner .......................... | 56/14.6 |
| 6,059,656 A | * | 5/2000 | Satzler ........................ | 460/116 |
| 6,247,295 B1 | * | 6/2001 | Hansen et al. ........... | 56/10.2 A |

* cited by examiner

Primary Examiner—Thomas B. Will
Assistant Examiner—Meredith Petravick
(74) Attorney, Agent, or Firm—Brant T. Maurer; Rebecca Henkel

(57) ABSTRACT

An agricultural combine is provided that estimates a hydraulic pressure of a rotor drive system based upon the speeds of the pump (or engine) and motor that drive the rotor. The pressure is estimated by generating a pump displacement control signal in a convention feedback control algorithm and using that signal together with a sensed motor speed signal and a sensed pump speed (proportional to engine speed) to estimate the hydraulic pressure.

11 Claims, 4 Drawing Sheets

COMBINE HAVING A SYSTEM ESTIMATOR TO MONITOR HYDRAULIC SYSTEM PRESSURE

FIELD OF THE INVENTION

The invention relates to agricultural combines and systems for controlling their operation. More particularly, it relates to control systems for controlling the hydraulic system pressure of a combine.

BACKGROUND OF THE INVENTION

Hydro-mechanical drive systems for combine rotors monitor a variety of system parameters when controlling the engagement, disengagement and speed of combine rotors. They typically have a variety of sensors that sense physical system parameters pressures, speeds, temperatures and positions of the various components comprising the systems.

Normally, physical system parameters, which are necessary for the feedback control algorithms and the display of data to the operator, are measured directly by using sensors. For example, a pressure sensor coupled to a hydraulic fluid conduit may directly indicate the hydraulic system pressure of the drive system. Other sensors may directly measure such parameters as rotor speed, shaft speed, oil temperature and the like.

Each sensor adds cost to the vehicle. Furthermore, it may be difficult if not impossible to measure certain parameters because of inaccessibility, sensor unreliability or the like. Because of these limitations it would be beneficial to eliminate one or more sensors to reduce the cost, reduce the size, and increase the reliability of the combine and its control systems.

One system parameter that may be estimated rather than sensed directly is hydraulic system pressure. Hydraulic system pressure is one of the indices used to determine if a rotor is starting to become slugged. The pressure can be sensed directly by a hydraulic fluid pressure sensor. Alternatively, and as disclosed in the present application, it can be estimated using a variety of other measured system parameters.

Once estimated, it can be used in a traditional control process such as delivering a warning to the operator that rotor slugging, engine stalling, or other mechanical damage.

Hydraulic system pressure is a particularly useful measure of rotor slugging (i.e. rotor jamming or plugging) in a combine that employs a PID feedback control loop to maintain the rotor speed constant, such as in the present system. In combines having such a control system, increasing loads on the motor experienced when the rotor begins to slug or jam, are not indicated by another parameter such as motor or rotor speed. When a PID control algorithm is used to keep the rotor operating at a constant speed, increased load on the rotor is compensated for by applying increased hydraulic fluid pressure to the hydraulic motor driving the rotor. This increased pressure is calculated to keep the rotor operating at its constant selected speed. In short, as the load increases, the system compensates by applying increased hydraulic pressure to the motor to maintain the motor (and hence the rotor it drives) at a constant speed. It is hydraulic system pressure, not motor or rotor speed, that more accurately indicates incipient slugging of the rotor.

It is an object of this invention to provide a system that will estimate hydraulic system pressure without using a separate hydraulic system pressure sensor.

It is a further object of this invention to provide a system that will predict rotor slugging and to indicate incipient slugging to the operator.

SUMMARY OF THE INVENTION

In accordance with a first aspect of the invention an agricultural combine is provided, including a chassis; an internal combustion engine mounted on the chassis; a drive system coupled to the engine, the drive system including: a hydraulic pump coupled to the engine to be driven thereby to provide hydraulic fluid under pressure; a hydraulic motor in fluid communication with the hydraulic pump to receive the hydraulic fluid under pressure and be driven thereby; a multi-speed gearbox having a plurality of selectable gear ratios; a rotor driven by the gearbox and configured to thresh agricultural products; and an electronic control system including: an engine speed sensor coupled to the engine to generate a signal indicative of engine speed; a motor speed sensor coupled to the motor to generate a signal indicative of motor speed; and at least one electronic controller coupled to the motor speed sensor and the engine speed sensor and configured to estimate the pressure of the hydraulic fluid under pressure.

In accordance with a second aspect of the invention, a control system for estimating a hydraulic pressure in a work vehicle, is provided, the work vehicle having at least a hydraulic pump and a hydraulic motor coupled together by hydraulic conduits, the conduits being configure to bi-directionally transmit hydraulic fluid between the pump and the motor, the control system comprising: a motor speed sensor coupled to the motor to generate a signal indicative of the motor speed; a pump speed sensor coupled to the pump to generate a signal indicative of the pump speed; and at least one electronic controller including a digital microprocessor and an electronic digital memory coupled to the motor speed sensor and the pump speed sensor, the electronic controller being configured to receive signal indicative of the motor speed, and signal indicative of the pump speed and to estimate a hydraulic fluid pressure in the conduits based upon the motor speed signal and the pump speed signal.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
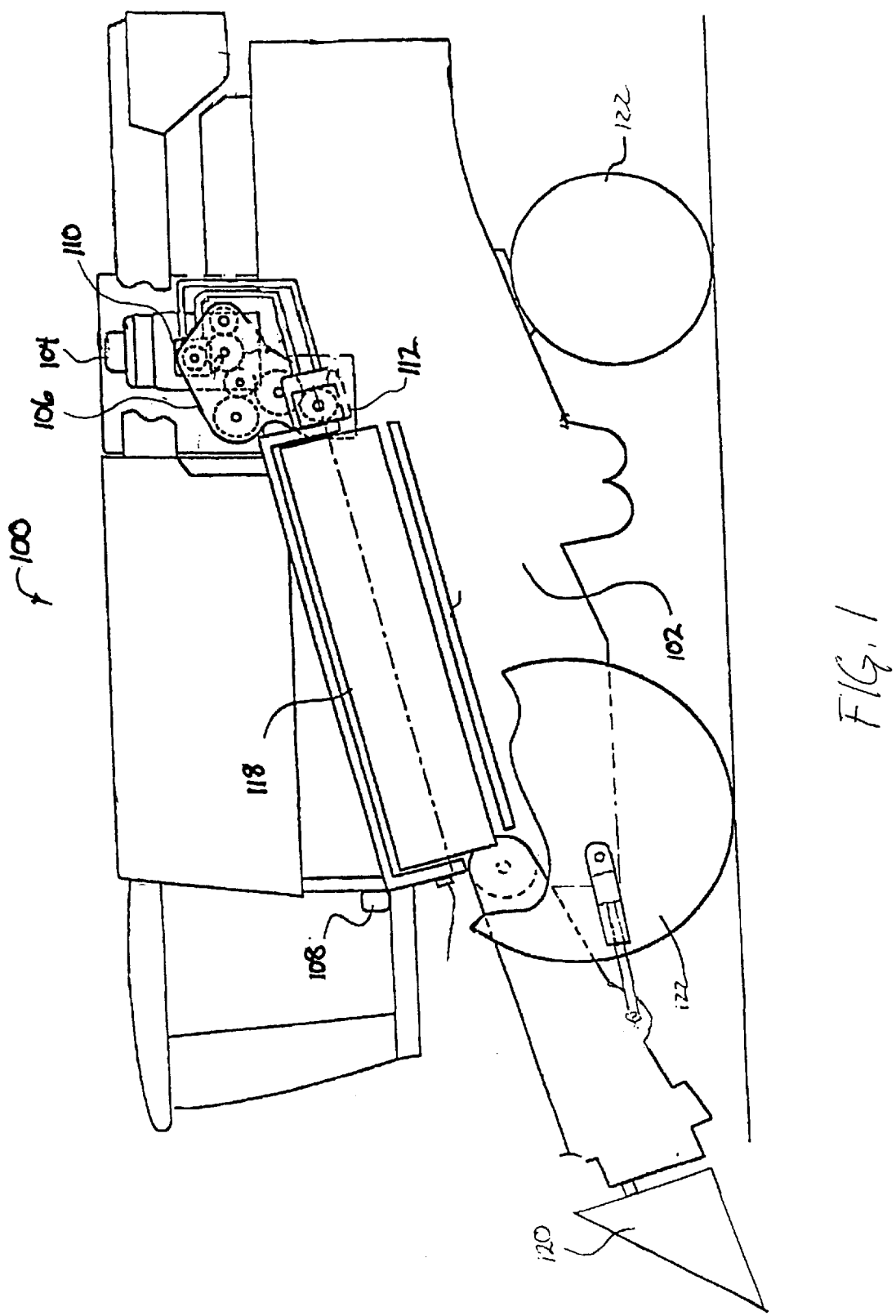
FIG. 1 is a side schematic view of an agricultural combine having a hydraulic drive system with parameters estimated by the present invention.
Figure 2:
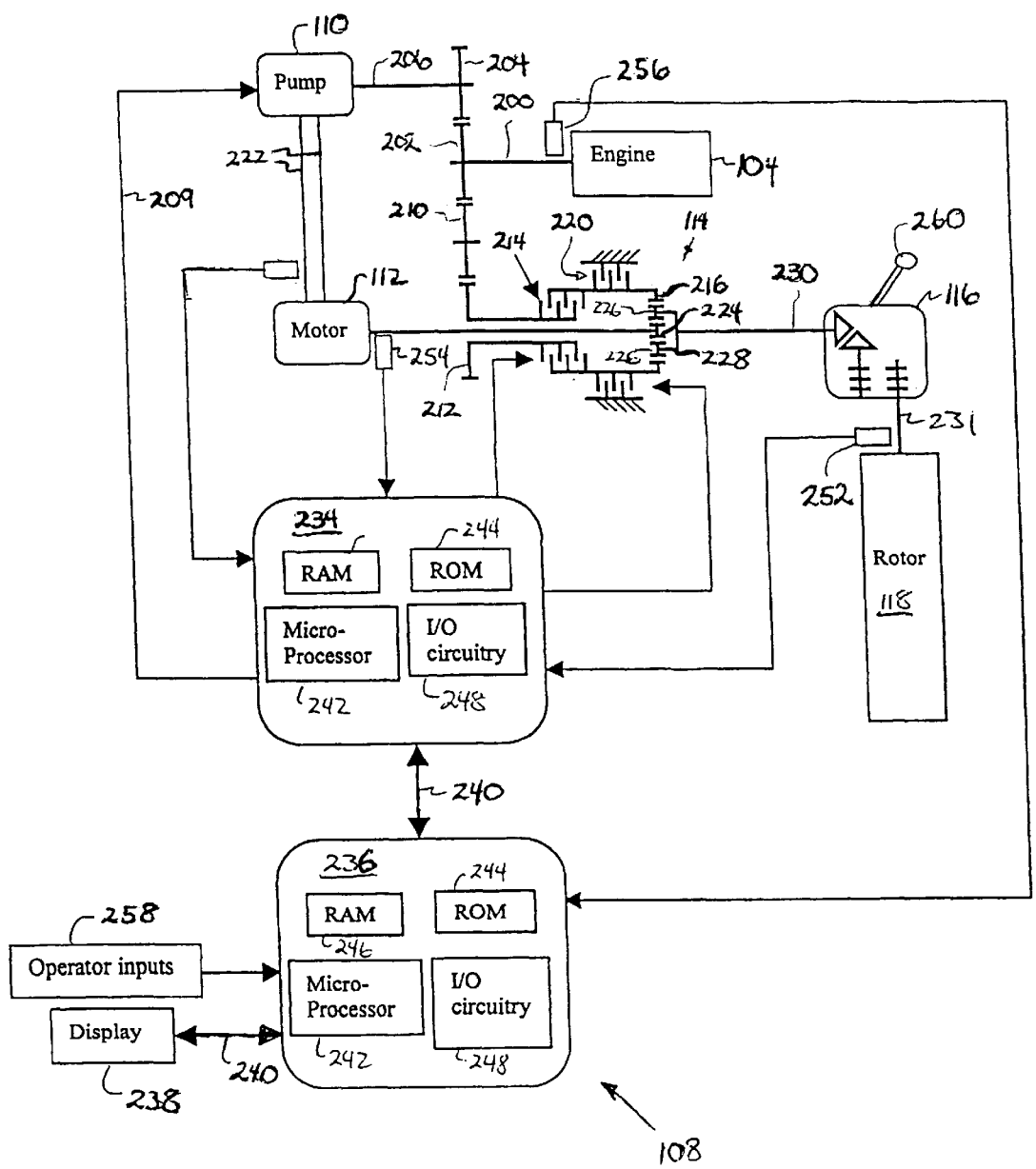
FIG. 2 is an electrical, hydraulic and mechanical schematic diagram of the drive system of the combine of FIG. 1.

Referring to FIGS. 1 and 2, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, gear trains coupling engine 104 to the pump, engine 104 to a planetary gear arrangement, the planetary gear arrangement itself, and a gearbox driven by the planetary gear arrangement that, in turn, drives the combine rotor 118.

Rotor 118 rotates with respect to chassis 102 and threshes agricultural material, such as corn or wheat. A header 120 is coupled to the front of the combine chassis to gather the agricultural material from the field and direct it into the rotor. The agricultural material is gathered by the headers and cut. Once cut it falls into a header trough that includes an auger. The auger drives the agricultural material toward the mouth of the rotor, which receives and threshes it.

Several wheels 122 are coupled to the chassis to engage the ground and support the combine as it travels over the ground. One or more hydraulic motors (not shown) are coupled to the wheels to drive the wheels in rotation, thereby driving the combine over the ground.

FIG. 2 illustrates construction details of the work vehicle (and particularly the drive system) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under computer control. In particular, pump 110 has internal electronic actuators that vary the specific displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114. When clutch 214 is engaged, engine 104 is coupled to and drives ring gear 216. When clutch 214 is disengaged, engine 104 is disconnected from ring gear 216.

A second clutch 220 (a ring-to-frame clutch) is coupled to and between ring gear 216 and the frame or chassis 102 (indicated by the ground symbol) to fix the ring gear with respect to the chassis or frame of the vehicle. When clutch 220 is engaged, ring gear 216 is fixed and cannot rotate.

Pump 110 is hydraulically connected to motor 112 by hydraulic conduits 222. These conduits conduct fluid to and from motor 112 to form a closed loop hydraulic (hydrostatic) drive circuit.

Motor 112 is coupled to and drives sun gear 224 of planetary gear arrangement 114. Sun gear 224 drives planet gears 226, which drive planetary gear carrier 228.

Gearbox 116 is a multi-speed gearbox having three manually selectable gear ratios with an input shaft 230 and an output shaft coupled to rotor 118. It is shifted to alternatively select one of the three gear ratios by manual manipulation of gearshift lever 260.

Input shaft 230 of gearbox 116 is fixed to and rotates together with planetary gear carrier 228. The output shaft 231 of multi-speed gearbox 116 is coupled to and drives rotor 118.

It should be clear that power from engine 104 to rotor 118 follows two parallel paths. The first path is from engine 104, though the gearing, through clutch 214, through planet gears 226 and into shaft 230. The second parallel path is from engine 104, through pump 110, through motor 112, through sun gear 224, through the planet gear 226 and into shaft 230.

In a normal mode of operation, power through both paths is provided to the rotor. Engine 104 operates most efficiently at a set and predetermined rpm, yet the rotor cannot be operated at a set, predetermined speed, but must be variable over some range or ranges of speed to harvest the several types of crops it is intended and designed to do.

To provide this variable rotor speed, the parallel power path from engine 104 through pump 110 and motor 112 to the sun gear is provided. The planetary gear arrangement permits power through both paths to be applied to the rotor. The motor drives the sun gear, the engine drives the ring gear. The planetary gear carrier is coupled to and driven by both the sun and ring gears and applies that combined power to the rotor through gearbox 116.

The rotor speed is not varied by varying the engine speed and the ring gear speed, which are constant. The rotor speed is generally varied by controller 234 which varies the motor speed. Controller 234 accomplishes this by varying the specific displacement of pump 110.

Electronics

An electronic control system 108, including three digital controller circuits and their associated sensors, controls the operation of the foregoing machine elements.

The system 108 includes a first digital controller 234, a second digital controller 236 and a third digital controller 238 that are coupled together over a serial communications network, here shown as a CAN bus 240 in accordance with the SAE J1939 communications standard.

Each controller circuit 234, 236, and 238 are similarly constructed, and include a microprocessor 242, a read-only memory (ROM) 244, a random access memory (RAM) 246 and an input/output (I/O) circuit 248. The ROM includes a control program that controls the operation of the controller. The RAM is temporary storage space for numeric values used in computation, and the I/O circuit is configured to process and condition external communication signals including communications with the sensors and the other controllers on the CAN bus 240. Each of these circuits is connected using a data/address/control bus of standard design, which is not shown. The controllers are connected to one another by CAN bus 240.

The first digital controller 234 is connected to two speed sensors, a rotor speed sensor 252, and a motor speed sensor 254. These sensors are respectively coupled to rotor 118 and motor 112 to sense the rotational speeds of these devices and transmit a signal indicative of those speeds to the first digital controller 234.

The speed sensors in the present system preferably generate a series of pulses as the devices to which they are coupled rotate. The faster the engine, rotor and motor turn, the faster the stream of pulses coming from the sensors arrives at controllers 234 and 236.

Common sensor arrangements that generate such pulse sequences include Hall effect devices and inductive pickups that sense the passage of slotted disks mounted on the shafts of the engine, rotor and motor.

The first digital controller 234 is also connected to and controls three other devices: pump 110, engine-to-ring clutch 214 and ring-to-frame clutch 220. Controller 234 generates and transmits a signal indicative of a desired specific pump displacement to pump 110 over electrical signal lines 209. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of second digital controller 236 is connected to an engine speed sensor 256 and to operator input device 258. Engine speed sensor 256 generates a signal indicative of the engine speed, typically by generating a pulse train similar to the motor speed sensor. The operator input device is preferably a switch responsive to operator manipulation that generates two separate signals, an "increase speed" signal and a "decrease speed" signal. Controller 236 is also connected to controller 234 and controller 238 via the CAN bus.

The third and final controller, controller 238, is a display controller. It is constructed the same as controller 234 and 236, but is dedicated to displaying data generated by the operator or the other controllers. This capability is provided by its own internal control program stored in its ROM memory. It includes a display device such as an LCD or electroluminescent display. It is coupled to the other controllers over CAN bus 240.

Programming

Controllers 234, 236, and 238 include internal digital control programs that control their operation. These programs are stored in the ROM memory of each controller. The programmed operation of each controller is discussed below.

During normal operation, controller 238 displays several data indicative of the vehicle's status. The first of these, the rotor speed, indicates the speed of the rotor. Controller 234 generates the rotor speed data from the rotor speed signal transmitted to controller 234 from rotor speed sensor 252. Controller 234 periodically calculates the rotor speed from the rotor speed signal and places this information on the CAN bus. The rotor speed is preferably calculated and placed on the CAN bus every 10 milliseconds.

Controller 238 is programmed to receive this rotor speed data over the CAN bus, and to translate them into display signals to drive its integral display. It applies the display signals to the display, thereby generating decimal digits on the display that represent the rotor speed. The display indicates the rotor speed as a sequence of decimal digits expressed in revolutions per minute.

Controller 238 also displays a range of rotor speeds the operator may select among. This range is displayed in the form of an upper and a lower limiting rotor speed. These limits are generated by controller 234 and are transmitted every 10 milliseconds over the CAN bus to controller 238.

Controller 238 receives these speed range signals, translates them into display signals to drive its integral display, and applies the signals to the display thereby generating decimal digits on the display that represent the upper and lower rotor speed limit values. These values are preferably expressed in revolutions per minute.

Controller 236 receives an increase-rotor-speed signal and a decrease-rotor-speed signal (also known as operator speed requests or commands) from operator input device 258. These signals are generated by input device 258 when the operator manipulates device 238. Controller 236 transmits these operator requests on the CAN bus.

Controller 234 receives these operator requests and determines whether or not to change the speed of the rotor in response. If it decides that the rotor speed can be changed, it raises or lowers the commanded (e.g. the target) rotor speed accordingly.

Controller 234 controls the rotor speed by regulating the specific displacement of pump 110. Controller 234 is programmed to execute a conventional PID feedback control loop that uses the commanded rotor speed (from the operator input device) as an input, and the actual rotor speed (from the rotor speed sensor) as the output. The difference between these two speeds is the error signal that is minimized by the PID control loop.

Controller 234 changes the commanded rotor speed based on two things: first, a command by the operator using the operator input device to either raise or lower the current commanded speed, and second, controller 234's determination that the rotor can indeed be driven at the speed requested by the operator. If both conditions are met, controller 234 changes the commanded rotor speed and applies it as an input to the PED loop it executes.

Controller 234 also determines whether the motor or the engine (or both) drives the rotor by selectively engaging and disengaging the engine-to-ring clutch 214 and the ring-to-frame clutch 220. In the discussion below, controller 234 transmits engagement and disengagement signals to the hydraulic valve (not shown) that controls the engine-to-ring clutch, causing it to become engaged (thereby connecting the engine to the ring gear) and disengaged (breaking the engine-to-ring gear drive connection). Controller 234 also transmits engagement and disengagement signals to the hydraulic valve (not shown) that controls the ring-to-frame clutch, causing it to engage (locking the ring with respect to the chassis or frame) and disengage (releasing the ring to rotate with respect to the chassis or frame).

In the normal operating mode, both the motor and the engine drive the rotor. In this mode, also called the hydro-mechanical mode, the engine runs at a relatively constant speed of 2150 rpm which, through the gearing and engine-to-ring clutch 214 connecting the engine to the ring gear, causes the ring gear to rotate at 2188 rpm.

The motor 112 is designed to be bi-directionally driven by pump 110 over a range of speeds from −4077 rpm to +3114 rpm. Given the gear ratios of the planetary gear arrangement, these speeds cause planetary gear carrier 228 to rotate at speeds ranging from 1144 to 2342 rpm.

The rotor cannot be driven at an infinite number of speeds in the normal (hydro-mechanical) mode since the motor has a limited range of operating speeds, the engine operates at a relatively fixed speed, and gearbox 116 has a predetermined set of gear ratios. By "gear ratio" we means the ratio of gearbox input shaft speed versus gearbox output shaft speed. Given these constraints, for any selected gear ratio of gearbox 116, there is an associated and predetermined range of permissible rotor speeds. These speeds are expressed as a rotor speed upper limit and a rotor speed lower limit. Again, each of the selectable gear ratios of gearbox 116 has an associated and different rotor speed upper and lower limit.

The input shaft 230 of gearbox 116 is connected to and driven by the planetary gear carrier 228. The gearbox has three different selectable gear ratios—ratios of gearbox input shaft to output shaft speeds. These gear ratios are selectable by manual operator manipulation of a conventional gearshift lever 260.

Given the gear ratio of the planetary gear arrangement and a ring gear speed of 2188 rpm, input shaft 230 of gearbox 116 rotates at speeds of between 1144 and 2342 rpm; at 1144 rpm, the motor is rotating at −4077 rpm. At −2342 rpm, the motor is rotating at 3114 rpm.

When the input shaft 230 rotates at a speed of between 1144 and 2342 rpm, the highest gearbox gear ratio rotates the output shaft of the gearbox (and the rotor to which it is coupled) at a respective speed of between 589 and 1206 rpm. For the middle gear ratio, this respective speed is between 391 and 800 rpm. For the lowest gear ratio, this respective speed is between 222 and 454 rpm. The output shaft speed varies with the motor speed.

When the motor rotates at −4077 rpm (and, again, assuming an engine speed of 2150 rpm), the rotor rotates at 589, 391, or 222 rpm, depending upon the gearbox 116 gear ratio. When the motor rotates at +3114 rpm, the rotor rotates at 1206, 800, or 454 rpm, depending upon the gear ratio.

Controller 234 achieves intermediate speeds within each of these three rotor speed ranges by varying the motor speed from −4077 to +3114 rpm. Controller 234 does this by controlling the specific displacement of pump 110 in the PID feedback control loop.

The operator is interested in controlling the rotor speed, since the rotor speed determines the rate at which the combine performs its work. It is for this reason that controller 234 is configured to transmit the rotor speed on the CAN bus to controller 238 to be displayed.

The operator cannot select any rotor speed, however, since the ranges of permissible rotor speeds are limited, as mentioned above. Each gearbox gear ratio has its own associated range of rotor speeds. As a result, the operator is also interested in knowing the range of rotor speeds that he can select. It is for this reason that controller 234 transmits the upper and lower rotor speed limits (which depend upon the currently selected gearbox gear ratio) on the CAN bus to controller 238 to be displayed.

Due to the PID feedback control of rotor speed, as the engine and rotor are loaded more and more, controller 234 and the engine governor compensate by keeping the engine, the motor and the rotor running at a constant speeds for a given commanded rotor speed. The only significant indication that the rotor is being loaded more heavily is the pressure in the hydraulic lines coupling the pump 110 to the motor 112. As controller 234 and the engine compensate for the increased load, the pressure in the hydraulic lines connecting the pump 110 and the motor 112 generally increases proportionately.

This additional pressure, in turn, causes the motor to apply a greater torque to the rotor through the drive system sufficient to counteract the increased load and keep the rotor turning at the commanded speed.

If the load on the rotor continues increasing, eventually pump 110 reaches a maximum pressure above which it cannot go without stalling the engine 104. The rotor is "slugged". "Slugging" as used herein refers to the condition in which the system is loaded so highly that the engine and/or the motor are unable to maintain the rotor at the commanded speed.

The operator receives little or no indication that the rotor is slugged. Since the system effectively maintains the rotor at the proper speed right up to the point at which it is lugged, there is no change in rotor speed to indicate incipient slugging.

For this reason the system 108 estimates hydraulic system pressure (in the preferred embodiment, the pressure in one if the lines 222 that conduct hydraulic fluid to and from the motor) and uses that pressure to indicate to the operator that the rotor is slugged or that slugging is about to occur.

By providing such notice, the operator can take preventive action, such as slowing the vehicle down and reducing the rotor speed. When the vehicle is slowed down, agricultural matter such as the crop being harvested is propelled into the rotor area at a reduced rate, which reduced the load on the rotor drive system. Furthermore, the power consumed in driving the vehicle over the ground is also reduced.

To estimate the hydraulic system pressure, controller 234 includes a mathematical model of the rotor drive system that relates engine speed, motor speed and the specific displacement of the pump. The specific displacement of the pump is a function of the signal that controller 234 applies to pump 110 to change its specific displacement.

By applying the motor speed signal, the engine speed signal, and the pump signal generated by the PID feedback control loop of controller 234 to the mathematical model of the drive system, controller 234 can estimate the hydraulic system pressure and determine whether slugging is occurring or is about to occur. If so, controller 234 sends a signal indicative of slugging to controller 238, which displays a corresponding slugging message on its integral display.

Dynamic System Model

Controller 234 incorporates several equations, which may be expressed, stored and calculated in a variety of forms well known in the art, to estimate the hydraulic system pressure in the conduits coupling pump 110 and motor 112. These equations constitute the mathematical model of the system and are provided below.

1. Pump Model:

$$\text{Pump\_Vel} = K1 * \text{Eng\_Vel} \qquad \text{Eqn. 1}$$

$$\text{Pump\_Disp} = \text{Pump\_I} * K2 \qquad \text{Eqn. 2}$$

$$Q2\text{-}1 = \text{Pump\_Disp} * \text{Pump\_I} \qquad \text{Eqn. 3}$$

where "Pump_Vel" is pump speed or velocity, "Eng_Vel" is engine speed or velocity, "Q2-1" is flow rate of the pump for fluid leaving the pump (i.e. the pressurized fluid), "Pump_Disp" is the pump displacement, "Pump_I" is pump current (i.e. the magnitude of the current signal applied to the pump by controller 234 to set the specific displacement of the pump), "K1" is a constant (the engine-to-pump gear ratio), and "K2" is a constant (the pump displacement-to-pump current signal gain).

2. Motor Model:

$$Q1\text{-}2 = \text{Motor\_Disp} * \text{Motor\_Vel} \qquad \text{Eqn. 4}$$

where "Q1-2" is the volumetric flow rate of fluid from the motor back to the pump (i.e. the low pressure fluid returned to the pump), "Motor_Disp" is the specific fluid displacement of the motor, and "Motor_Vel" is the motor speed velocity.

3. Hydraulic Circuit Model:

$$P1\text{-}2 = K3 * (Q1\text{-}2 - Q2\text{-}1) \qquad \text{Eqn. 5}$$

where P1-2 is the hydraulic system pressure, and K3 is a constant (the effective orifice constant). These equations are combined to provide the model 300 shown in FIG. 3.

Figure 3:
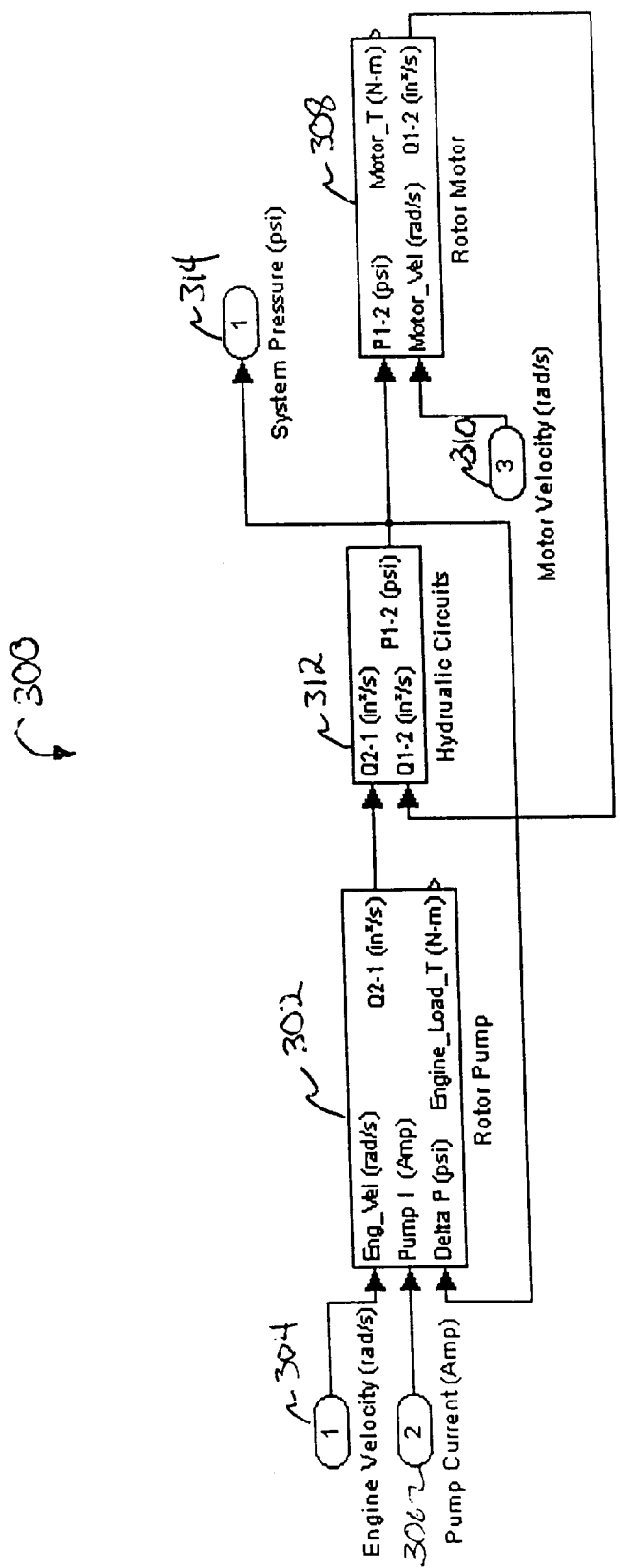
FIG. 3 is a graphical representation of the pump and motor drive system model from which the hydraulic system pressure is estimated.

Referring to FIG. 3, block 302 illustrates the pump model. Using the engine speed ("Engine_Vel") 304 and the pump current ("Pump_I") 306 (i.e. the signal applied to the pump by controller 234) controller 234 solves for Q2-1, the flow out of pump 110.

Block 308 illustrates the model of the hydraulic motor 112. Using the motor velocity ("Motor_Vel") 310 provided by the motor speed sensor and the constant specific displacement ("Motor_Disp") of the motor, controller 234 solves for flow out of the motor ("Q1-2").

Block 312 illustrates the model of the hydraulic circuits (i.e. the hydraulic lines) connecting the pump and motor, Using the flow out of the motor ("Q2-1") and the flow out of the pump and into the motor ("Q1-2"), controller 234 solves for the hydraulic system pressure ("P1-2") 314.

Once controller 234 estimates the system pressure based on engine speed, motor speed and the specific displacement signal that controller 234 applies to the pump, controller 234 compares this estimated system pressure with a predetermined value of the system pressure that is stored in the ROM memory of controller 234.

If the estimated pressure meets or exceeds the predetermined pressure, controller 234 sends a message to controller 238 over the CAN bus indicating that the threshold (or predetermined) pressure has been exceeded. Controller 238 receives this signal and generates a display signal that is transmitted to the integral display of controller 238. This display signal causes display 238 to display the message "SLUGGING" on the display.

It should be clear that, in the speed matching process, controller 234 estimates a physical parameter (hydraulic system pressure) of the rotor drive system based upon an internal mathematical model of the drive system and other measured physical parameters (the motor speed and the engine speed). In the PID feedback control loop, controller 234 determines the appropriate specific displacement (e.g. drive) signal to be applied to the pump to maintain the rotor speed constant. Controller 234 combines this pump drive signal with the motor speed and the engine speed to estimate the system pressure.

Figure 4:
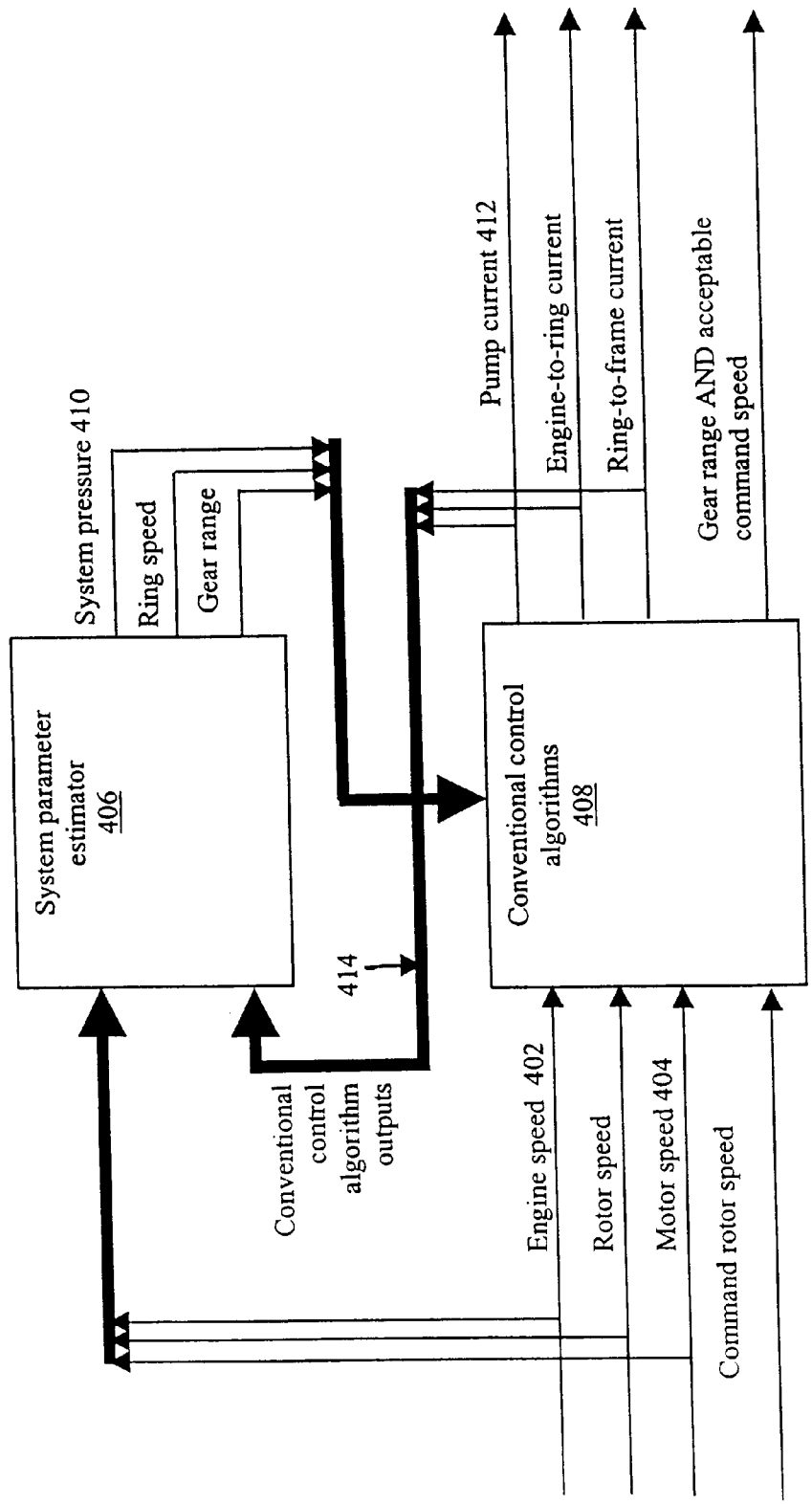
FIG. 4 is a top-level system diagram of the estimation and control functions performed by the electronic control system of the combine.

This process is shown schematically in FIG. 4, which graphically represents the estimation and feedback control processes.

On the left hand side of FIG. 4, the engine speed 402 and the motor speed 404 are received by controller 234 as inputs from the engine and motor speed sensors. These inputs are provided to both a system estimating portion 406 of the control program of controller 234 and to a conventional control algorithm portion 408 of the control program of controller 234.

The system estimating portion 406 estimates the hydraulic system pressure 410 based upon the engine speed, the motor speed and the pump command signal (e.g. the current applied to the pump to vary its specific displacement) 412—which is proportional to the specific displacement of pump 110.

The pump command signal 412 is calculated by the conventional control algorithm portion of the control program of controller 234 when the conventional control portion (which includes the PID feedback control loop) calculates the pump command signal that will maintain the rotor at a constant speed. it is provided to the system estimating portion 406 as shown by line 414.

Thus, a conventional control program generates one of the values that is used by the system estimating portion 406 to estimate a system parameter. This generated value is produced by the PID feedback control loop of the conventional control algorithm portion 408 as the controlled variable of the control loop—in this instance the current (i.e. specific displacement) signal applied to the pump.

It will be obvious to those skilled in the art that various changes may be made without departing from the scope of the invention and the invention is not considered to be limited to what is illustrated in the drawings and described in the specification.

What is claimed is:

1. An agricultural combine comprising;
   a. a chassis;
   b. an internal combustion engine mounted on the chassis;
   c. a drive system coupled to the engine, the drive system including:
      i. a hydraulic pump coupled to the engine to be driven thereby to provide hydraulic fluid under pressure;
      ii. a hydraulic motor in fluid communication with the hydraulic pump to receive the hydraulic fluid under pressure and be driven thereby;
      iii. a multi-speed gearbox having a plurality of selectable gear ratios;
      iv. a rotor driven by the gearbox and configured to thresh agricultural products; and
   d. an electronic control system including;
      i. an engine speed sensor coupled to the engine to generate a signal indicative of engine speed;
      ii. a motor speed sensor coupled to the motor to generate a signal indicative of motor speed; and
      iii. at least one electronic controller coupled to the motor speed sensor and the engine speed sensor and configured to estimate the pressure of the hydraulic fluid under pressure.

2. The combine of claim 1, wherein the at least one electronic controller includes a feedback control program that generates a pump displacement signal.

3. The combine of claim 2, wherein the at least one electronic controller is configured to combine the signal indicative of engine speed, the signal indicative of motor speed, and the pump displacement signal in order to estimate the pressure of the hydraulic fluid under pressure.

4. The combine of claim 3, wherein the at least one electronic controller includes a first and a second electronic controller, wherein the first controller is coupled to the motor speed sensor and the second controller is coupled to the engine speed sensor, the combine further including a serial communication circuit configured to couple the first and second controllers.

5. An agricultural combine comprising;
   a. a chassis;
   b. an internal combustion engine mounted on the chassis;
   c. a drive system coupled to the engine, the drive system including:
      i. a hydraulic pump coupled to the engine to be driven thereby to provide hydraulic fluid under pressure;
      ii. a hydraulic motor in fluid communication with the hydraulic pump to receive the hydraulic fluid under pressure and be driven thereby;
      iii. a multi-speed gearbox having a plurality of selectable gear ratios;
      iv. a rotor driven by the gearbox and configured to thresh agricultural products; and
   d. an electronic control system including;
      i. an engine speed sensor coupled to the engine to generate a signal indicative of engine speed;
      ii. a motor speed sensor coupled to the motor to generate a signal indicative of motor speed; and
      iii. at least one electronic controller coupled to the motor speed sensor and the engine speed sensor and configured to estimate the pressure of the hydraulic fluid under pressure, wherein the at least one electronic controller includes a feedback control program that generates a pump displacement signal, wherein the at least one electronic controller is configured to combine the signal indicative of engine speed, the signal indicative of motor speed, and the pump displacement signal in order to estimate the pressure of the hydraulic fluid under pressure, wherein the at least one electronic controller includes a first and a second electronic controller, wherein me first controller is coupled to the motor speed sensor and the second controller is coupled to the engine speed sensor, the combine further including a communication circuit configured to couple the first and second controllers, and wherein the first electronic controller includes a feedback control program configured to generate the pump displacement signal.

6. The combine of claim 5, wherein the second electronic controller is configured to transmit the signal indicative of engine speed to the first electronic controller.

7. An electronic control system for a combine including a drive system having a hydraulic pump to provide hydraulic fluid under pressure, comprising:

a. an engine speed sensor coupled to an engine of the combine to generate a signal indicative of engine speed;

b. a motor speed sensor coupled to a motor of the combine to generate a signal indicative of motor speed; and c. at least one electronic controller coupled to the motor speed sensor and the engine speed sensor and configured to estimate the pressure of the hydraulic fluid under pressure, wherein the at least one electronic controller includes a feedback control program that generates a pump displacement signal.

8. The electronic control system of claim 7, wherein the at least one electronic controller is configured to combine the signal indicative of engine speed, the signal indicative of motor speed, and the pump displacement signal in order to estimate the pressure of the hydraulic fluid under pressure.

9. The electronic control system of claim 7, wherein the at least one electronic controller includes a first and a second electronic controller, wherein the first controller is coupled to the motor speed sensor and the second controller is coupled to the engine speed sensor, the combine further including a communication circuit configured to couple the first and second controllers.

10. An electronic control system for a combine including a drive system having a hydraulic pump to provide hydraulic fluid under pressure, comprising:

a. an engine speed sensor coupled to an engine of the combine to generate a signal indicative of the engine speed;

b. a motor speed sensor coupled to a motor of the combine to generate a signal indicative of the motor speed; and c. at least one electronic controller coupled to the motor speed sensor and the engine speed sensor and configured to estimate the pressure of the hydraulic fluid under pressure, wherein the at least one electronic controller includes a feedback control program that generates a pump displacement signal, wherein the at least one electronic controller is configured to combine the signal indicative of engine speed, the signal indicative of motor speed, and the pump displacement signal in order to estimate the pressure of the hydraulic fluid under pressure, wherein the at least one electronic controller includes a first and a second electronic controller, wherein me first controller is coupled to the motor speed sensor and the second controller is coupled to the engine speed sensor, the combine further including a communication circuit configured to couple the first and second controllers, wherein the second electronic controller is configured to transmit the signal indicative of engine speed to the first electronic controller, wherein the first electronic controller includes a feedback control program configured to generate the pump displacement signal.

11. The electronic control system of claim 10, wherein the second electronic controller is configured to transmit the signal indicative of engine speed to the first electronic controller.

* * * * *